United States Patent [19]
Valentine

[11] 4,026,039
[45] May 31, 1977

[54] EDUCATIONAL DEVICE FOR LEARNING BASIC MEASUREMENTS

[75] Inventor: Charles G. Valentine, Stamford, Conn.

[73] Assignee: Xerox Corporation, Stamford, Conn.

[22] Filed: Apr. 27, 1973

[21] Appl. No.: 355,138

[52] U.S. Cl. .......................................... 35/19 A
[51] Int. Cl.$^2$ ................................... G09B 23/18
[58] Field of Search ............ 35/8 R, 8 A, 9 R, 9 A, 35/9 B, 9 C, 10, 11, 13, 19 R, 19 A, 48 R

[56] References Cited
UNITED STATES PATENTS

| | | | |
|---|---|---|---|
| 2,374,800 | 5/1945 | Bohlke | 35/19 A |
| 2,568,535 | 9/1951 | Ballard | 35/19 A |
| 3,077,696 | 2/1963 | Barnett et al. | 35/19 A X |
| 3,245,156 | 4/1966 | De Bloois et al. | 35/8 A |
| 3,520,074 | 7/1970 | Severin et al. | 35/48 R |

Primary Examiner—Richard C. Pinkham
Assistant Examiner—Vance Y. Hum

[57] ABSTRACT

An educational kit for teaching a student about basic electrical measuring devices is disclosed. The kit includes an instructional means, and a simulator board which permits the student to learn how to use electrical meters by taking measurements of various electrical quantities in actual simple and complex circuits that the student sets up on the simulator.

6 Claims, 10 Drawing Figures

AUDIO VISUAL MEANS

FIG. 8

WORK SHEETS

FIG. 9

ELECTRICAL METER

FIG. 10

EDUCATIONAL DEVICE FOR LEARNING BASIC MEASUREMENTS

BACKGROUND OF THE DISCLOSURE

I. Field of the Invention

This invention relates to an educational device, and more particularly to an educational kit primarily for demonstrating, illustrating, testing and instructing about the use and operation of electrical meters.

II. Description of the Prior Art

A problem of increasing difficulty in the education field is that of providing relatively simple means for instructing students in a particular technology. This problem is particularly acute in community colleges, vocational high schools, trade schools, corporations which offer on-the-job training, in military service training schools, and other special schools where various types of technologies, such as for example, mechanical and electrical technologies, are sought to be taught on a simplified basis. This problem has been accentuated by the large number of new technological fields that have been developed over the past several years, and also by the large number of students seeking to gain knowledge of these fields. These developments, coupled with the high cost and complexity of the various educational devices used in schools to teach these technologies have given rise to a tremendous demand for simple, relatively inexpensive, rugged, easily assembled, relatively portable and easily understood educational devices to teach these technologies.

Furthermore, at some point during the learning process, it is desirable that the student extend beyond textbooks, manuals or diagrams and be afforded the opportunity to see, examine, and manipulate the system under study. Physical manipulation of the system aids the student in better understanding what he hears or reads about and therefore complements the entire learning process.

Recent years have marked the introduction of a large number of educational teaching devices aimed at instructing students in various technologies. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed. Although numerous efforts have been made to construct simple, relatively inexpensive, rugged, easily assembled, relatively portable and easily understood educational devices, known devices, although satisfactory in some of these respects, do not possess these combined advantages when compared to the novel and advantageous educational kit of the present invention.

U.S. Pat. No. 2,374,800 describes an advertising display device comprising a panel which includes a volt-ohmmeter, a plurality of different electrical circuit elements and various terminals used as an advertising display for promoting the sale of electrical meters.

U.S. Pat. No. 3,374,556 describes an educational game for learning about resistors comprising a game board on which are mounted a plurality of electrical components.

The present invention, however, is directed to a programmed educational kit which employs a multimedia approach in teaching a relatively sophisticated technology whereby a student can learn by himself by using a simulator board in response to instruction means which is logically keyed to the simulator board.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few effective educational devices available in the community colleges, the junior colleges, the vocational high schools, the trade schools and other special schools where various types of mechanical, electrical, medical or other occupational technologies are sought to be taught on a simplified and individualized basis. There is a great need for programmed instructional materials in the various areas of occupational technology such as for example, electronics, automotive technology, drafting, heating and air conditioning, and in the medical and chemical areas of technology, as well as in the traditional areas of high school study.

SUMMARY OF THE INVENTION

It is therefore an object of the present invention to overcome the disadvantages of the prior art educational devices and to provide an educational kit which is simpler, more durable, less expensive, more easily assembled and still more pleasing from a design viewpoint than prior art devices and otherwise more suitable for use in various types of learning institutions for understanding and acquiring a substantial amount of knowledge about electrical meters.

It is a further object of this invention to provide programmed educational kits which present information using a multimedia approach.

It is a further object of this invention to provide an educational kit which is compact when assembled.

It is a further object of this invention to provide an educational kit which is quickly disassembled for easy storage in a very small space.

It is a further object of this invention to provide an educational kit which does not require the student to use a single grommet, screw, bolt, rivet or similar fastening type connection.

It is a further object of this invention to provide an educational kit suitable for teaching students the fundamentals about electrical meters, i.e., a voltmeter, ammeter, and ohmmeter, including how to use electrical meters to take measurements of various electrical qualities in actual simple and complex circuits.

It is a further object of this invention to provide an educational kit which enables an instructor to play a more active role in student learning.

It is a further object of this invention to provide an educational kit which enables the student to learn using several forms of communication It is a further object of this invention to provide an educational kit which enables the student to participate in different kinds of learning experiences; i.e., the student listens to information while viewing a series of related visuals, such as photographs, drawings, written information, etc., and participates in a manipulative activity.

It is a further object of this invention to provide an educational kit which provides means to test the student while he is learning.

It is still a further object of this invention to provide an educational kit which, in addition to its educational features and mechanical advantages, possesses a pleasing design.

The foregoing objects and others are accomplished in accordance with the present invention by providing an educational kit for teaching about electrical meters comprising audiovisual instructional means; a simulator board including graphic indicia on a surface thereof defining an electrical circuit including a plurality of broken portions in the circuit; a plurality of electrical jacks, each of the jacks being arranged within the circuit and being electrically connected on the bottom portion of the board defining an incomplete circuit as graphically depicted on the surface of the board; and means for connecting a voltage source to the board; and at least one mounted resistor adapted to be inserted into certain of the jacks.

The educational kit in accordance with the invention is designed to teach about electrical meters using a programmed multimedia approach whereby the student hears and sees information, performs by answering questions, solves problems and manipulates objects. Each time a student learns something new, he responds to this new knowledge or skill to make sure he has learned it correctly. First, he performs an activity such as by answering a question or solving a problem. Then he finds out immediately if the answer is correct. If the student finds that his answer is correct, this "instant feedback" motivates him to continue learning. If he discovers that his answer is wrong or inadequate, he can stop at that point and find out where his error is.

The educational kit is designed for individual use, use by small groups without the need for extensive supervision or participation by an instructor or use by groups with an instructor. It permits the student to learn at his own pace, and also affords him the chance to capitalize on the way he learns best because he participates in different kinds of learning experiences. He listens to information while viewing a series of related visuals and participates in manipulative activity. He is thus totally involved in the learning process.

BRIEF DESCRIPTION OF THE DRAWING

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
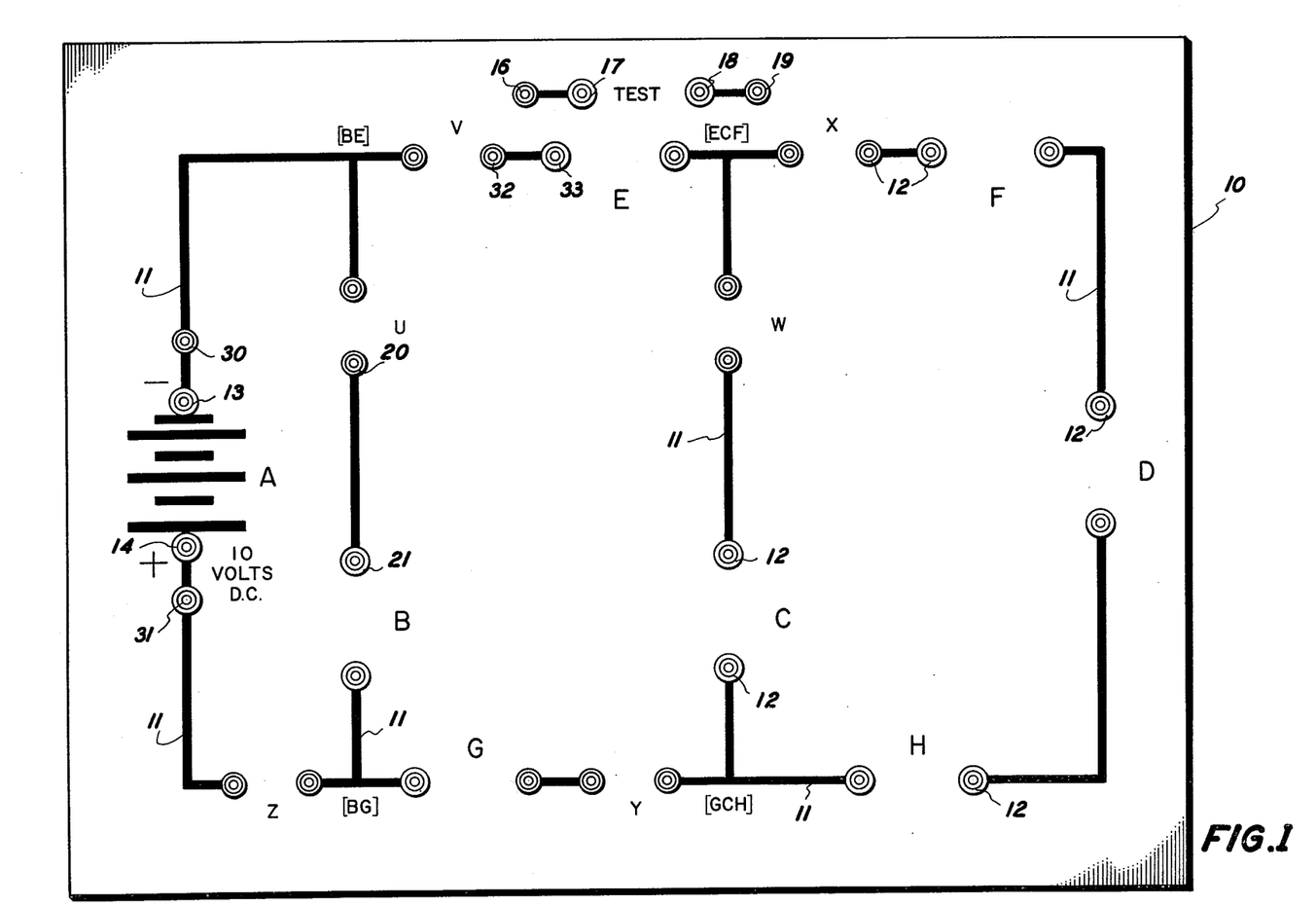
FIG. 1 is a plan view of a preferred simulator board in accordance with the invention.
Figure 2:
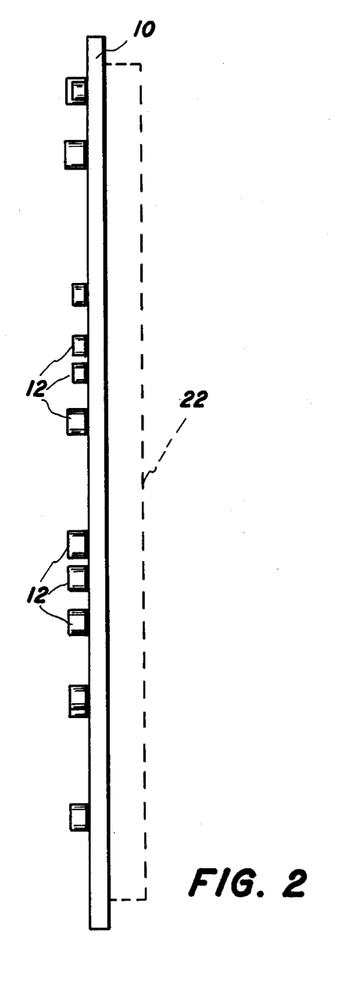
FIG. 2 is a side plan view of the simulator board shown in FIG. 1.

In FIGS. 1-2 there is shown a simulator board 10 which actively allows a student to actually use his hands as a learning tool as well as his eyes and ears. By performing activities using the simulator board, the student takes an active part in the learning process and achieves an understanding of electrical meters more quickly.

As shown in FIG. 1, a preferred simulator board 10 in accordance with the invention is shown including graphic indicia 11 that defines an electrical circuit including a plurality of broken portions, each of the broken portions being identified by graphic indicia, preferably by using various letters such as those shown in FIG. 1. A plurality of electrical jacks 12, preferably female-type jacks, are arranged on the board. Several of these jacks are arranged within the circuit at various locations therein. The board includes means for connecting a voltage source to the board. This is preferably done by providing within the circuit a pair of jacks 13 and 14 and graphic indicia which represents that this portion of the board is used for connecting the power supply to the board. Various types of power supply units can be used such as, for example, a D.C. power supply unit. Whatever source is used to supply voltage to the board, the leads from the voltage source are connected from the power supply unit to jacks 13 and 14, the correct polarity being designated by the plus and minus signs on the board in spaced relationship to these jacks. Located at the top portion of the board are two pairs of jacks 16, 17, 18, 19 used for measuring resistance values of mounted resistors using an ohmmeter in the manner as described hereinbelow.

On the board 10 are mounted jacks 12 which extend through the board to the bottom portion thereof. As shown on the board in FIG. 1, each of the jacks is connected by graphic indicia 11 which represents electrical connections (simulated wiring) forming an incomplete electrical circuit. On the bottom portion of the board, the jacks are electrically connected by wire to form a circuit as depicted graphically on the front portion of the board. Thus, for example, on the bottom portion of the board there is a wire connecting jacks 20 and 21, a wire connecting jacks 16 and 17, etc. The electrical wiring and components projecting on the bottom portion of the board is designated as 22 in FIG. 2.

Figure 3:
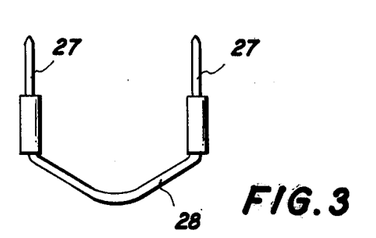
FIG. 3 is a plan view of preferred connecting leads.

FIG. 3 is representative of one of several male-type connecting leads which are used with simulator board 10 to provide a complete electrical circuit when constructing a circuit on the simulator board. The connecting leads includes a wire member 28 and probes 27 which are adapted to be inserted into certain of the jacks on the board in the manner as described hereinbelow.

Figure 4:
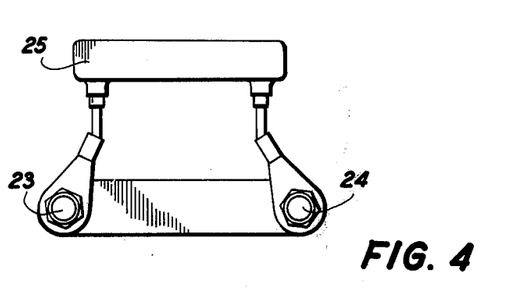
FIG. 4 is a top plan view of a preferred mounted resistor.
Figure 5:
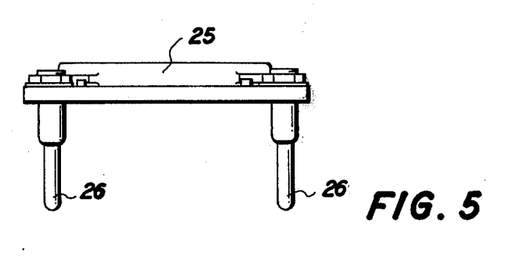
FIG. 5 is a side view of the mounted resistor shown in FIG. 4.

FIGS. 4 and 5 represent one of preferably numerous mounted resistors included with the educational kit and used with simulator board 10 and connecting leads as shown in FIG. 3. to construct simple and complex circuits on the simulator board. The mounted resistor includes a resistor 25 and probes 26 which are adapted to be inserted into certain of the jacks on the board in the manner as described hereinbelow. The mounted resistor includes means for connecting the leads from a voltmeter to be mounted resistor such that the voltmeter is connected in parallel with resistor 25 in a circuit. Thus, a voltage drop across resistor 25 can be properly measured. The means used for accomplishing this result is preferably in the form of jacks 23 and 24 which form part of the mounted resistor. Each of the mounted resistors preferably includes graphic indicia on a surface thereof identifying the resistors, e.g., $R_1$, $R_2$, etc. Furthermore, it is within the scope of this invention to use resistors 25 having any of numerous values of resistance. For example, all of the resistors used can have different values of resistance, they can all have the same resistance value, or some can have the same resistance value whereas others can differ.

The simulator board 10 can be constructed by numerous methods. For example, the board can be constructed of a sheet of ferrous metal, such as for example, galvanized steel or a plastic, over which is painted a neutral background color, such as for example, a yellow or white enamel. The graphic indicia present on the board can then preferably be printed over the enamel background in a suitably contrasting color, such as for example, black. The printing may be accomplished by any suitable means, such as for example, a silk screening process. Although the simulator board may consist solely of a thin sheet of metal with suitably smooth edges, the sheet is preferably laminated to a suitable backing member, such as Masonite, which imparts a desirable rigidity thereto and also allows the simulator board to be conveniently handled. Thus, in one preferred embodiment of this invention, the simulator board comprises a thin sheet of metal having a thickness of about 1/32 inch laminated to a backing member made from a rigid material such as fiber board, or a resinous material, the backing member having a preferred thickness of about ¼ inch. The edges of the completed board can be covered with a plastic material to obtain a neat appearance and also to avoid the problem of having sharp edges. The simulator board can also be constructed of a sheet of a rigid material such as a polymeric material, for example, a vinyl material, or Masonite. In this embodiment, the background color and graphic indicia are placed on the material as described above. The dimensions of the simulator board should be such that the board can be conveniently used by the student at a given workplace. Boards having dimensions of about 15 × 20 inches, or approximately 300 square inches, are particularly suitable.

Various kinds of instructional means can be employed with the educational kit in accordance with the invention. For example, one of the preferred embodiments for instructional means is an audiovisual presentation using slides or film strips in conjunction with a descriptive audio account of the visuals, such as an audio cassette. The visual materials are synchronized with the audio presentation. The audiovisual portion makes it possible for a student to learn by listening to a description while seeing what is being described. A recorded narrator provides background information, describes equipment, or explains principals of operation while a series of illustrated visuals (photographs, graphs, drawings, written material, etc.) is shown to the student synchronized with the audio presentation. The narrator also tells the student, for example, how to proceed; whether to observe something that is being shown to him; to perform an activity on the simulator board 10, or to complete a question or problem on the student's worksheet; he suggests points at which the student might ask for help and, along with the visual portion provides answers to the questions presented on the work sheets or information about the simulator or equipment. The audiovisual presentation is stopped each time the narrator asks the student to do something. The student starts the sequence again after he completes the activity.

The audiovisual equipment needed, of course, will vary depending on the type of instructions to be given. A rear screen projector for small groups, or a projector and screen for a classroom presentation may be used. For the audio presentation either visual projection equipment with built-in audio capability or a separate cassette recorder may be used. The audio presentation may be on, for example, cassettes, and the visual portion on, for example, 35 mm film strip or slides.

In order to give the student an additional opportunity to check his grasp of the material he is learning, the student is called upon throughout the unit to construct definitions, label components, answer questions, and solve problems. To achieve these objects the kit preferably includes work sheets that restate the question or problem and provide working space and answer blanks. The work sheets are preferably laminated so that the student can easily erase an answer and redo a problem with the added advantage that the sheets can be cleaned off for use by another student. The work sheets are also beneficial in telling the instructor about a student's work habits and whether or not he is benefiting from the kit. In addition, an instructor's review of the work sheets can help him locate the point at which the student is having difficulty.

All of the above materials can be conveniently housed in a compartment-like case for easy use and storage. Thus, the educational kit which can include the simulator board 10, the instructional means, such as video slides or tapes, the audio cassettes, and the work sheets, can all be contained within one case. The kit may also include sample tests or quizzes which can be given by the instructor before and after use of the program and an instructor's manual.

An example of how a preferred embodiment of an educational kit in accordance with the present invention may be used to teach a student how to use various electrical meters is as follows: The audiovisual presentation begins with a general description of the various electrical quantities that can be measured in an electrical circuit and the various measuring devices which are used for measuring each of these electrical quantities. For example, the audiovisual presentation describes that electromotive force is measured with a voltmeter which is used to determine the voltage existing between two points in a circuit; current is measured by an ammeter which is used to measure the amount of current flowing in a circuit; and resistance is measured with an ohmmeter (sometimes called megohmmeter) which is used to measure circuit continuity and total or partial circuit resistance.

During the audiovisual presentation as the student is introduced to various concepts, terms, definitions, etc., he may be asked to copy certain of these items in his work sheets. During the presentation, the student is also referred to his work sheets to solve problems and answer various questions. For example, during the portion of the presentation when the student is introduced to the various electrical measuring devices, he is asked to copy the definition of each of these devices into his work sheets. As the audio portion of the program introduces each of the various measuring devices to the student, actual pictures of these devices are shown to the student on the slides.

The presentation continues with a general discussion of the basic construction of the most common mechanisms found within the various electrical meters. The presentation also focuses on the similarities and differences between the various electrical meters. For example, the student is told that although each of the meters, namely the voltmeter, ammeter and ohmmeter, is used to measure a specific quantity, they usually all have the same kind of meter movement mechanism. One of the most frequently used meter movement mechanisms is known as the D'arsonval meter movement, which consists of a coil of fine wire on an aluminum frame, the coil of wire being mounted between the ends of a permanent magnet. When current from the circuit being tested passes through the coil, an electromagnetic field is set up. The polarity of the coil causes it to be repelled by the poles of the permanent magnet. A spring is included which returns the coil to its starting position when the current stops. The student is told that the D'Arsonval movement is also called a moving coil and that the movement in the meter depends on the strength of the magnetic field set up in the coil which is, in turn, determined by the amount of current in the coil. The audiovisual presentation continues by giving the student a detailed description of the various electrical meters including such items as the scales used on the meters and the basic construction of the magnetic mechanism in each of these meters. While the audio portion of the presentation discusses the various meters, the student is simultaneously shown that which the audio portion is discussing including schematic drawings of the internal mechanisms of these meters. The instructional material is presented to the student by means of visual slides and a synchronized audio presentation.

The presentation includes a detailed discussion of how each of the meters are used to measure the various electrical quantities and the basic procedures to be followed when one uses each of these meters. For example, the presentation explains to the student that when an ammeter is used (1) it should always be connected in series with the load and the energy source within the circuit; (2) polarity must always be observed, i.e., one must connect the negative lead of the ammeter to the negative side of the circuit and the positive lead of the ammeter to the positive side of the circuit; and (3) one must always set the selector switch on the ammeter to the highest range before connecting the ammeter to the circuit. With regard to a voltmeter the voltmeter (1) must always be connected in parallel with the load resistor in the circuit; (2) must be connected to the circuit so that the current enters from the negative side of the meter; and (3) the range selector switch on the voltmeter must be set to its highest range before the voltmeter is connected across a load resistor. For an ohmmeter, the major rule that is stressed is that the resistance must be removed from the circuit's energy source before measuring its resistance value.

Figure 6:
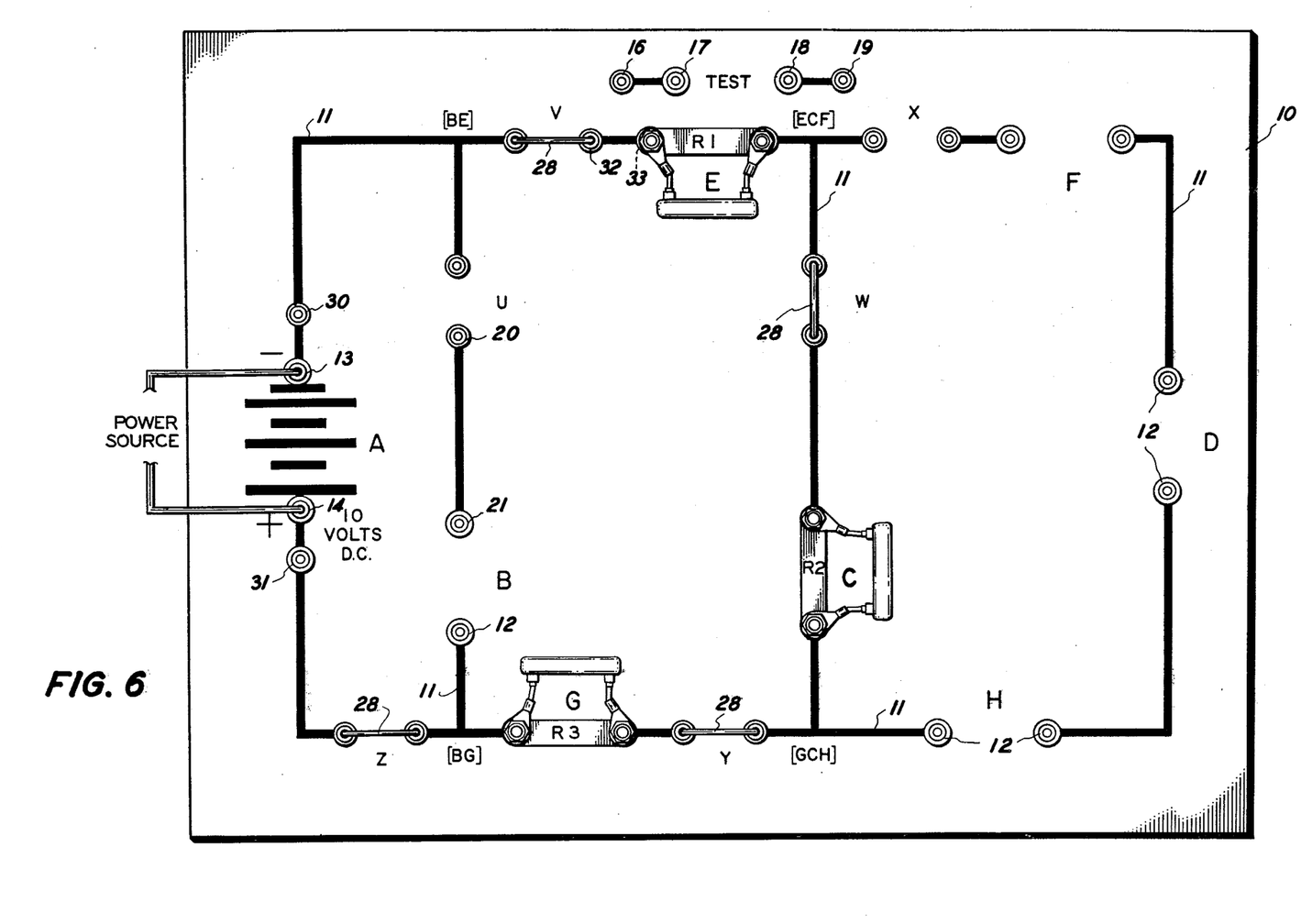
FIG. 6 is a plan view of the simulator board shown in FIG. 1 with several connecting leads and mounted resistors in place.
Figure 7:
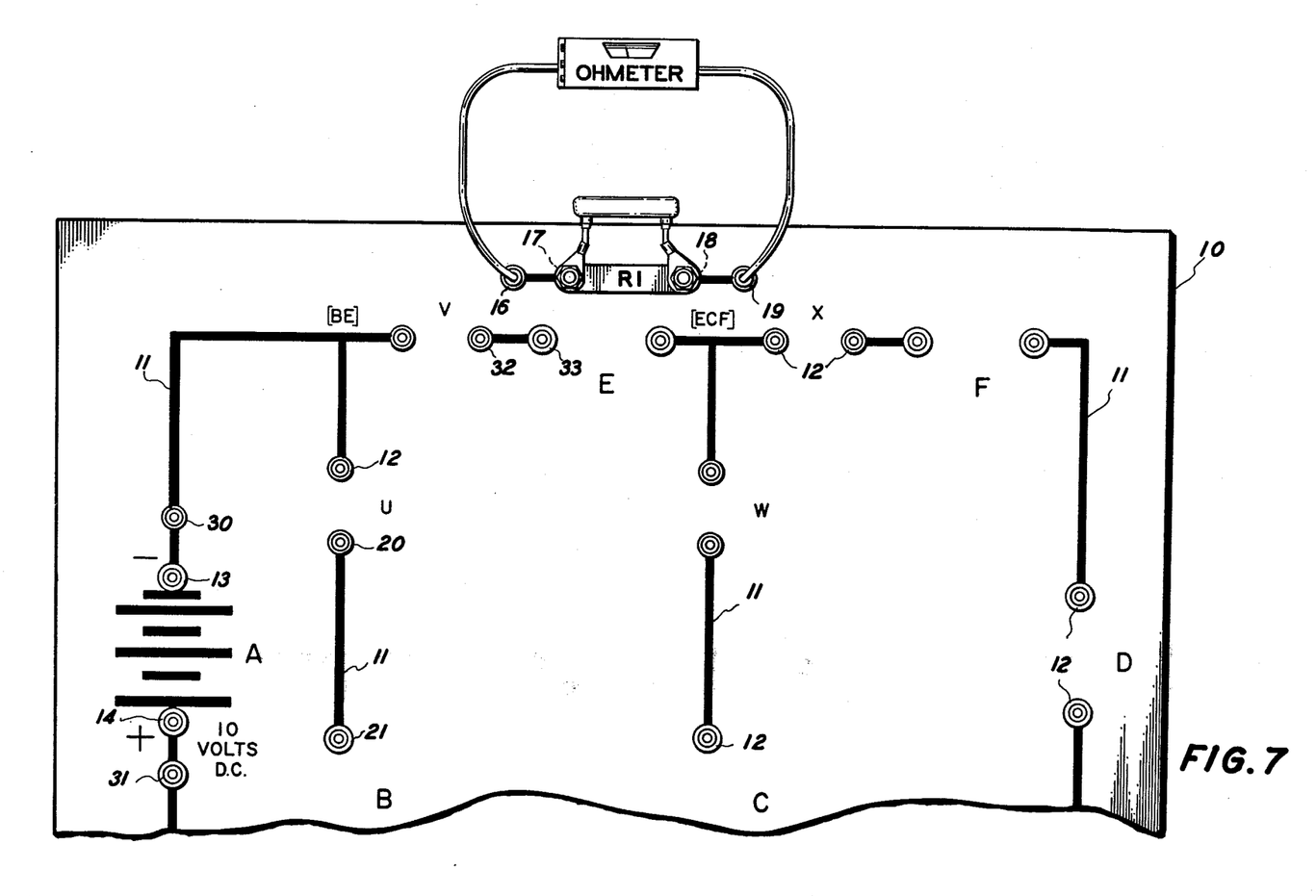
FIG. 7 is a sectional plan view of the simulator board shown in FIG. 1 with a mounted resistor in place.
Figure 8:
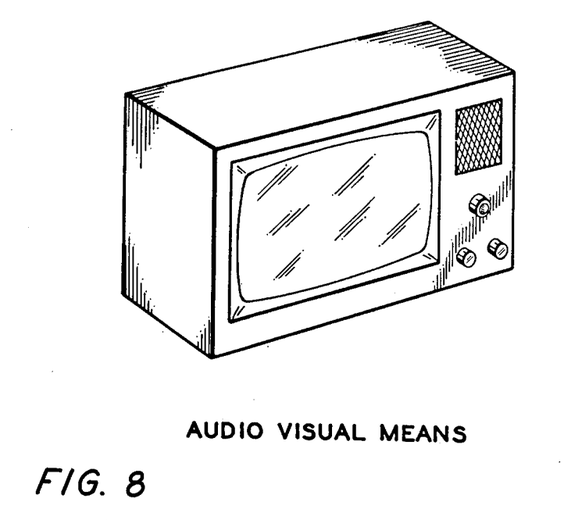
FIG. 8 illustrates generally an audiovisual device suitable for use in the present invention.
Figure 9:
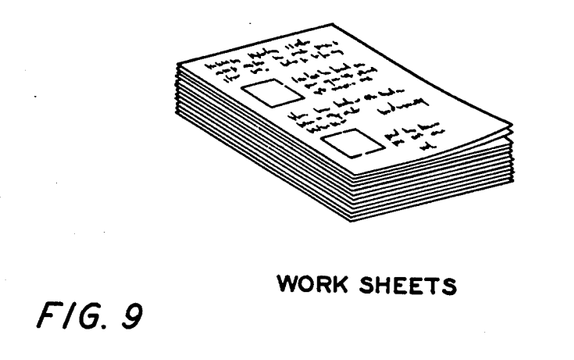
FIG. 9 illustrates generally worksheets in accordance with the present invention.
Figure 10:
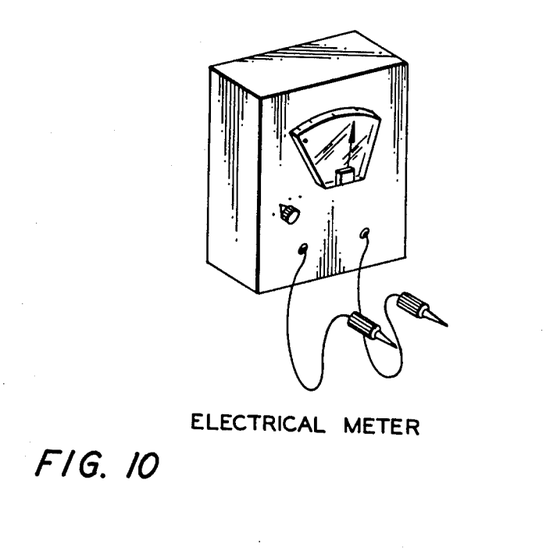
FIG. 10 illustrates generally an electrical meter suitable for use in the present invention.

At certain points during the presentation, the student is asked to turn to the simulator board. To further teach the student to learn how to use electrical meters, he is asked to take measurements, using actual meters, of various electrical quantities in actual simple and complex circuits that the student sets up on the circuit board simulator. For example, the student is told to mount resistors (as shown in FIGS. 4 and 5) $R_1$ in space E, $R_2$ in space C, $R_3$ in space G and four connecting leads (as shown in FIG. 3) in spaces V, W, Y, and Z. Thereafter, the student plugs in a power supply unit to the simulator board and sets the unit to provide 5 volts output. The simulator board having resistors $R_1$, $R_2$, and $R_3$ and the four connecting leads in place on the board in the spaces as described is shown in FIG. 6. Thereafter, the student attaches the leads from a voltmeter to jacks 30 and 31 at space A and records the input voltage to the circuit that he has constructed on the board. The student then proceeds to use the leads from the voltmeter and plug them into jacks 23 and 24 located on each of mounted resistors $R_1$, $R_2$, and $R_3$ to obtain the voltage drop across each of these resistors. To measure the current in the simulator circuit, the student removes, for example, the connecting lead connected at space V, plugs the leads from the ammeter into jacks 32 and 33 and records the current value at this portion of the circuit. In a similar manner, connecting leads are removed from spaces W, Y, and Z and current values are obtained at each of these points in the circuit. Thereafter, the student is told to use Ohm's Law to make certain calculations, e.g., the value of each of resistors $R_1$, $R_2$ and $R_3$. To further increase his understanding of the operation of an ohmmeter, and also to check whether he calculated the correct values of resistance for each of the resistors, the student inserts each of resistors $R_1$, $R_2$ and $R_3$ in the test jacks 17 and 18 in the manner as shown in FIG. 7 and measures the values of each of the resistors by connecting the leads of the ohmmeter to jacks 16 and 19.

In a similar fashion as described above, the student can use the simulator board 10, the mounted resistors as shown in FIGS. 4 and 5 and connecting leads as shown in FIG. 3 to construct various series and parallel circuits on the board and measure various electrical quantities found within the circuits using an ohmmeter, ammeter, and voltmeter. In addition to separately constructing series and parallel circuits, the student can construct various complex circuits and measure various electrical quantities in the manner as outlined above. The above-described educational kit is programmed such that the student will encounter a minimum of frustration and a maximum of learning efficiency while using the kit.

After using the educational kit in accordance with the present invention, the student will learn how to use electrical meters and will be able to describe the use, operation, and the quantity measured of an ammeter, voltmeter and ohmmeter; describe the operation of a D'Arsonval meter movement and label the parts on a diagram; describe in one paragraph or less the purpose and function of a shunt resistor in an ammeter and a series resistor in a voltmeter; define full-scale deflection for a meter, megger or megohmmeter, milliampere or ma, ranges on a meter, infinity reading on an ohmmeter, and open end short; measure any current, voltage or resistance, given an actual D.C. electrical circuit and an ohmmeter, ammeter and voltmeter within 20% of the same measurement taken by an experienced technician; list three rules to be followed when using an ammeter; and list three rules to be followed when using a voltmeter.

Details of the various methods by which students can use the educational kit of this invention are explained in detail in "Occupational Technology Series, Electronics Technology, Basic measurements, Unit 11069-81" published by the Xerox Corporation.

I claim:

1. An educational kit programmed for teaching about electrical meters comprising in combination:
  a. a simulator board including (i) on a first area of said board graphic indicia on a surface thereof defining an electrical circuit including a plurality of broken portions in said circuit and indicia separately identifying each of said broken portions each of said broken portions adapted to receive a resistor to complete the electrical connection across said broken portion; a plurality of electrical jacks, each of said jacks being arranged within said circuit and being electrically connected to the bottom portion of said broad defining an incomplete circuit as graphically depicted on said surface of the board, a plurality of said jacks being adapted to receive the leads from electrical meters and means for connecting and metering a voltage source to said circuit including a first pair of electrical jacks, a second pair of electrical jacks adapted to receive the leads from a voltmeter whereby the input voltage to the boards circuit can be measured and indicia defining said first pair of jacks as the voltage source; and (ii) on a second area of said board means for measuring the resistance values for resistors including two pairs of electrical jacks, certain of the jacks in said pairs adapted to connect the leads from a resistor thereto and certain of the jacks in said pairs being adapted to receive the leads from an ohmmeter;
  b. a plurality of mounted resistors each including a pair of male plugs adapted for insertion within a pair of said female jacks on said board to abridge one of said broken portions within the circuit, and a pair of female jacks for connecting the leads from a voltmeter to said mounted resistor whereby the voltmeter is connected in parallel with said resistor in said circuit for measuring the voltage across said resistor, said mounted resistors further adapted for use with said resistance measuring means; and
  c. audio-visual instruction means for presenting information relating to the use and operation of electrical meters, said audio-visual instruction means including visual and audio instructional portions terminating in audio directions to the user of said kit to perform a manipulative activity using the first and second areas of said simulator board and said mounted resistors, said instruction means stopping upon completion of said audio directions and being restartable by the kit user upon completion of said manipulative activity.

2. An educational kit according to claim 1 further including a plurality of connecting lead wires adapted for insertion in certain of said jacks to provide a complete electrical path in said circuit.

3. An educational kit according to claim 1 wherein each of said mounted resistors includes graphic indicia thereon identifying each of said resistors.

4. An educational kit according to claim 1 wherein said audio instruction means includes tape recordings which are synchronized with said visual instruction means which includes slides or film strip.

5. An educational kit according to claim 1 wherein said kit includes a plurality of student work sheets, said work sheets being adapted for use by the student to record information and test the student in response to said audiovisual instruction means.

6. An educational kit according to claim 1 wherein said simulator board is constructed of a substantially rigid material.

* * * * *